Oct. 2, 1951 WEN YUAN PAN 2,569,687
SIGNAL DETECTOR CIRCUIT
Filed Dec. 1, 1948
Fig. 1
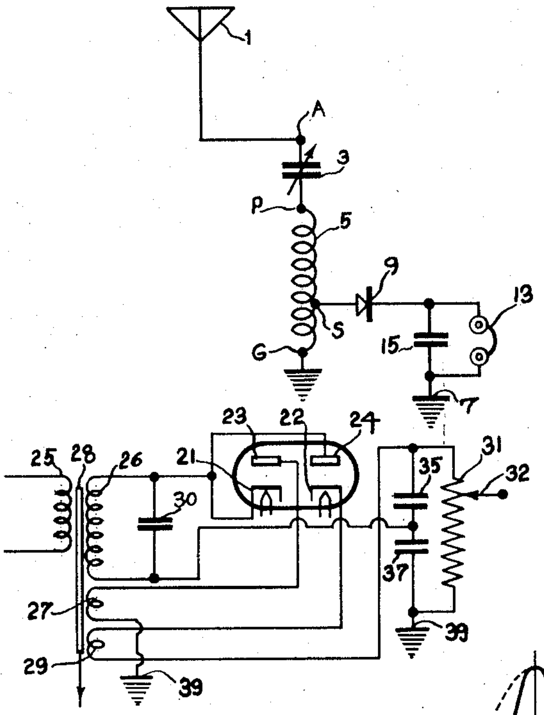
Fig. 2.
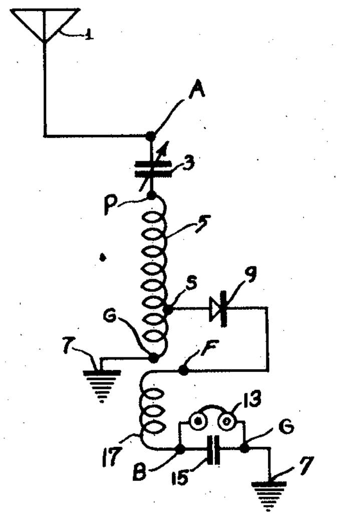
Fig. 5.
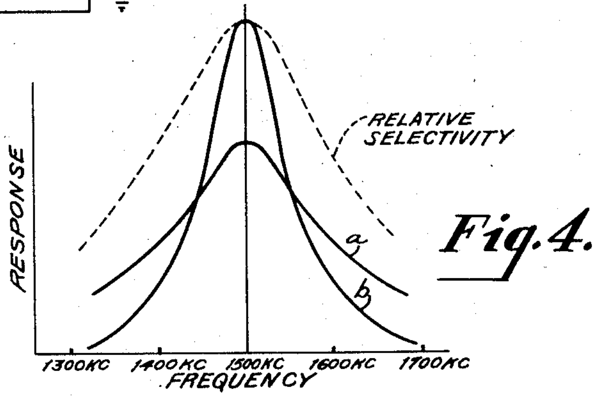
Fig. 4.
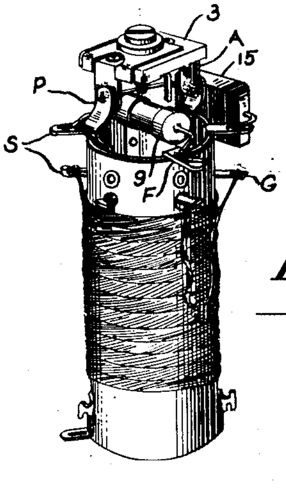
Fig. 3
INVENTOR
WEN YUAN PAN
BY T. J. Harbaugh
ATTORNEY Patented Oct. 2, 1951 2,569,687

UNITED STATES PATENT OFFICE 2,569,687

SIGNAL DETECTOR CIRCUIT

Wen Yuan Pan, Collingswood, N. J., assignor to Radio Corporation of America, a corporation of Delaware Application December 1, 1948, Serial No. 62,808

1 Claim. (Cl. 250—20)

The invention relates to radio frequency signal detector circuits, more particularly to crystal detector circuits.

An object of the invention is to provide an improved non-amplifying detector circuit having substantially increased selectivity and/or efficiency not heretofore obtainable in the absence of amplification.

Another object of the invention is to provide an improved crystal detector circuit having substantially enhanced selectivity without decreased sensitivity or efficiency.

It is well known in the art that crystal detector circuits are characterized by poor selectivity and sensitivity. Attempts to increase selectivity have resulted in further decreases in sensitivity.

In accordance with the invention the sensitivity or efficiency, and the selectivity of a detector circuit, employing a detector such as a crystal that consumes no power for its operation, have been substantially improved by means of a negative resistance effect resulting from feedback of radio frequency components from the rectified output or audio frequency circuit into the radio freqeuncy input circuit. While feedback has been well known in regenerative circuits using three electrode vacuum tubes with gains in excess of unity, there has never been any reason to expect that improved results would follow from using feed-back with crystal detector or diode detector circuits where the gain is less than unity.

This invention will be better understood by reference to the following detailed description, taken in connection with the accompanying drawing which represents the preferred embodiment of the invention.

Referring to the drawing:

Fig. 1 is a circuit diagram of a crystal detector receiving circuit used, as a basis of comparison, to derive one of the curves shown in Fig. 4;

Fig. 2 is a schematic diagram of a radio frequency receiving circuit embodying the invention;

Fig. 3 is an isometric view in elevation of the apparatus embodying the invention;

Fig. 4 shows a plurality of characteristic curves based upon the circuits of Figs. 1 and 2; and Fig. 5 is a schematic diagram of a modified form of the invention.

Referring to Fig. 1, there is illustrated a crystal detector circuit comprising an antenna 1, a variable tuning capacitor 3, an inductor or auto transformer 5, and ground 7, all connected in series relationship. A crystal detector 9, preferably of the germanium type (Sylvania 1N34) is connected to a tap S on the inductor as a step-down auto transformer of such ratio that the impedance match is optimum, for maximum transfer of signal energy. The primary of the transformer may be designated by points PG and the secondary by points SG. The output of the detector is connected to conventional earphones 13, of about 2000 ohms impedance, by-passed in the usual manner with a capacitor 15, of the order of .005 mfd., to ground 7. The circuit was designed to operate at 1500 kc., and the inductor 5 had sufficient winding turns that with a tuning capacity of fifty micromicrofarads the circuit was resonant to this frequency.

Measurements showed that the operating Q, or factor of merit of the series resonant primary circuit, was about twenty-five with the secondary tap point S about one-third the distance along the inductance from the ground end, using 7/41 litz wire wound on a coil form one inch in diameter and about two and one-half inches long. With this arrangement, better than normal results, heretofore realized, were obtained in regard to sensitivity and selectivity.

Referring to the modification shown in Fig. 2, a feed-back inductor 17 was inserted in series between the detector 9 and the phones 13 of Fig. 1, and closely coupled to the main inductor or auto transformer 5 at the lower end thereof. In the output circuit comprising the secondary of transformer 5, detector 9, inductor 17, and bypass capacitor 15, there are audio frequency signal currents resulting from detection of the incoming modulated radio frequency carrier, as well as radio-frequency components or unidirectional pulses resulting from rectifying the carrier. The radio frequency components traverse the bypass capacitor, the inductor 17 and are fed back into the main inductor or transformer primary. It is believed that the unusual results are caused by the introduction of a certain amount of negative resistance tending to neutralize the resistance reflected into the tuned transformer circuit by the load. It was found that the operating Q, hence selectivity, was increased as much as five times and the sensitivity was greatly improved, as shown in Fig. 4, hereinafter discussed. The tap S on the main inductor was adjusted to such a point that the voltage transfer was a maximum, that is, the ratio of the antenna impedance $Z_a$ to the reflected detector or load impedance $Z_d$ equals the ratio of the primary inductance $L_p$ to the secondary inductance $L_s$, the inductance of the part below the tap S.

$$Z_a/Z_d=L_p/L_s$$

The voltage wave at point F consists of radio-frequency pulses, either positive or negative, depending upon the polarity of the crystal detector connection. The R.-C. time constant was made quite long, so that such radio-frequency pulses retain their original phase relationships. The amplitude of the radio-frequency pulses was somewhat less than that of the signal input to the detector, but when such radio-frequency pulses are fed back to the input circuit they impart to the input circuit a negative resistance.

The reactance of the feedback inductance at radio frequencies involved should be large compared to the impedance of the R.-C. circuit, but the reactance at audio frequencies should be small compared to the R.-C. impedance. The relative polarity of the inductor 17 should be such that the feedback is positive or regenerative. Other types of feedback means, e. g. capacity coupling, may be used.

Referring to Fig. 4, curve *a* was plotted between response in microvolts and the frequency in the case of the circuit of Fig. 1, and shows a broad, unselective characteristic. Curve *b* is a similar characteristic curve plotted for the circuit of Fig. 2, and shows the much greater selectivity and enhanced sensitivity obtained by means of the feedback action.

Fig. 3 shows the structural characteristics of the device shown schematically in Fig. 2. The inductor or transformer 5 was found with 7/41 litz wire a distance of about one inch along a coil form having a one-inch outside diameter and about 2½ inches long. The feedback inductor 17, closely coupled to the main inductor or transformer 5, was wound adjacent the lower end G of inductor 5 a distance of about ½ inch along the coil form. The adjustable capacitor 3 was mounted upon terminals A and P at the upper end of the coil form. This device was designed for operation at 1500 kc. and for that reason a trimmer type capacitor having a limited capacity variation, adapted for adjustment by means of a screw driver, was provided. In case the device is intended for operation at any desired frequency throughout the broadcast tuning range, a capacitor having a larger range of variation would be employed. If desired the usual interleaving plate type variable condenser with a tuning dial may be used.

The bypass capacitor 15 and detector 9 were mounted in a similar manner at the same end of the coil form as the capacitor 3. The detector 9 is preferably of germanium, and is mounted in a small cartridge resembling a fuse container, type 1N34 (Sylvania).

Experiments showed that while the above dimensions gave good results, still better efficiency was obtained by the use of a transformer of the order of 1¾ inches long wound on a tube with an outside diameter of 1¾ inches. Still better results were obtained by tuning the inductor with a ferrite core instead of a capacitor. The particular device above described was, however, inexpensive and compact, gave excellent results, and therefore was chosen for purposes of production.

The following tests were made to determine the improvement in selectivity of the device shown in Figs. 2 and 4. A signal of one volt at 1000 kc., derived from an oscillator, was impressed across the input terminals A and G of the circuit in Fig. 1 through a dummy antenna, and a resulting voltage of 25 volts was measured across inductor 5, between terminals P and G. A corresponding signal of one volt at 1000 kc. was impressed between terminals A and G of Fig. 2 through a dummy antenna. A voltage of 125 volts was measured across inductor 5 between terminals P and G. In the case of Fig. 1, it was determined that the Q of inductor 5 was about 125 under similar load conditions. The tap positions of S in Figs. 1 and 2 were adjusted to optimum in both cases. The effect of the feedback was to neutralize a substantial position of the resistance on the input circuit, and resistance comprising that of the tuned circuit and that reflected into inductor 5 from the load circuit. This arrangement may be used in a high frequency high voltage, low current, power supply circuit, wherein a substantially higher D. C. voltage is obtainable from rectifying the output of a radio frequency oscillator.

Tests were made with reception in Camden from the following broadcasting stations varying in distance from the receiver from two miles to twenty-five miles, with good selectivity and sensitivity: WFIL, 560 kc.; WIP, 610 kc.; WPEN, 950 kc.; WIBG, 990 kc.; KYW, 1060 kc.; WCAU, 1210 kc.; WCAM, 1310 kc.

While in the foregoing cases the invention has been shown in its application to half wave rectification where the half cycles of one polarity are fed back in proper phase, or regeneratively, to reinforce the corresponding half of the undetected wave in the input circuit, it has equal utility in a full wave rectification, particularly in a voltage doubler detector. Referring to Fig. 5, the invention has been illustrated in connection with a thermionic dual diode detector comprising cathodes 21 and 22 and anodes 23 and 24, where a substantial improvement in gain and selectivity are also obtained. In this arrangement, an intermediate frequency signal of the order of 455 kc. is supplied to the anode 24 of one diode from an I. F. transformer in the intermediate frequency channel of a superheterodyne receiver. The transformer comprises a primary inductor 25 and secondary inductor 26 shunted by a small capacitor 30. A feedback inductor 27 is placed in series between the anode 23 of one diode and ground, and a feedback inductor 29 is in series between cathode 22 of the other diode and the high potential side of the load circuit 31. Both inductors are tightly coupled to the secondary of the I. F. transformer. The load circuit in this case comprises a resistor 31 of the order of 50,000 ohms shunted by capacitors 35 and 37 in series of the order of 470 mmf. each, and grounded at 39. The low potential side of the secondary 26 of the I. F. transformer is connected to a point between capacitors 35 and 37.

Resistor 31 is provided with a variable tap 32 as a volume control connection for impressing the detected signals upon audio amplifier section, not shown, of the receiver. As a result of the invention the above value of diode load resistance is lower than normal thereby greatly improving the ratio of the A. C. to D. C. impedance of the diode load circuit, hence enhancing the fidelity of reproduction, without sacrificing selectivity and/or gain. The transformer is shown as tunable by means of a ferro-magnetic core 28 of a material known as "ferrite," characterized by unusually high permeability and low loss. See Phillips Technical Review No. 8 of 1946, Dr. Snoek.

While a substantial improvement in selectivity as well as sensitivity is possible, it seems apparent that the greatest utility of the invention is in connection with detectors of the crystal type, wherein no external source of power is required for operation. The circuit of Fig. 2 could obviously be changed to a voltage doubler circuit as in Fig. 5.

To one skilled in the art, it would appear satisfactory to obtain a substantial improvement in selectivity with a crystal detector circuit without much sacrifice in sensitivity. One would consider it quite unusual, however, to obtain such improvement in selectivity with not only no sacrifice in sensitivity, but with an actual improvement in sensitivity, such as was obtained in this case in accordance with the invention. In actual practice it may be desirable to use a less expensive and/or smaller construction, as by using ordinary wire and/or a smaller and more compact winding form, thereby sacrificing sensitivity. In such a case there may be no improvement in sensitivity over the usual detector circuits known to the art, only an improvement in selectivity.

What is claimed is:

In a receiving system for modulated radio frequency signals comprising a tuned radio frequency antenna input circuit and a load circuit, the said input circuit comprising a variable condenser in series with a grounded step down transformer having primary and secondary sections, the said load circuit comprising a crystal detector connected to the secondary section of said transformer, a positive feed back inductor connected to the output side of said crystal and inductively coupled to said transformer, a by-pass capacitor connected in parallel with a pair of earphones, the said earphones being also connected to the said feedback inductor and to ground, said transformer having a step-down ratio substantially equal to that between the impedance reflected into said input circuit from said load circuit.

WEN YUAN PAN.

REFERENCES CITED

The following references are of record in the file of this patent:

UNITED STATES PATENTS

| Number | Name | Date |
|---|---|---|
| 1,881,032 | Staley | Oct. 4, 1932 |
| 1,938,657 | Hansell | Dec. 12, 1933 |
| 2,522,914 | Winchel | Sept. 19, 1950 |

FOREIGN PATENTS

| Number | Country | Date |
|---|---|---|
| 311,524 | Great Britain | May 16, 1929 |